INVENTORS.
HANNS ARNT VOGELS
MANFRED WAHLSTER
BORUT MARINCEK

BY *McGlew & Toren*

ATTORNEYS.

United States Patent Office 3,413,113
Patented Nov. 26, 1968

3,413,113
METHOD OF MELTING METAL
Hanns Arnt Vogels, Essen-Bredeney, and Manfred Wahlster, Bochum-Stiepel, Germany, Borut Marincek, Kusnacht-Zurich, Switzerland, and Kurt Koch, Oberhausen-Sterkrade, Germany, assignors to Rheinstahl Huttenwerke, A.G., Essen, Germany
Filed July 21, 1965, Ser. No. 473,678
Claims priority, application Germany, July 22, 1964,
R 38,428
4 Claims. (Cl. 75—12)

ABSTRACT OF THE DISCLOSURE

A process for operating a furnace having a separate heating device in the upper portion and an induction heater in the lower portion comprises charging the furnace with a liquid charge which includes a solid charge portion, initially heating the charge to melt the solid charge at least predominantly by heating the upper portion of the furnace, and refining the furnace charge during the heating and heating the lower portion of the furnace to approximately the temperature range of the melting temperature. A final refining of the steel is carried out by a refining heating of the charge predominantly by induction heating of the lower portion of the furnace and continuously charging the furnace with a solid metallic charge in finely divided form while the heating in the upper portion of the furnace is carried out and while the induction heater is operated in the lower portion of the furnace.

---

This invention relates in general to the construction of a furnace and a method for its operation, and in particular to a new and useful furnace for the production of steel having two separate heating arrangements and to a method of operating the furnace to produce steel.

Furnaces for the production of steel simultaneously with the carrying out of metallurgical slag processes are known in various embodiments. In the electric arc furnace, refining or blowing is necessary to a very limited extent only. For this reason, the original charge may contain small amounts of crude iron only. However, undesired contaminations in the scrap component have sometimes a more disturbing effect than when a Siemens-Martin furnace is used which operates with a higher crude iron content. Electro-steels which are melted in an electric arc furnace have a high purity in respect to non-metallic inclusions. However, due to the gas ionization in the furnace atmosphere, such electro-steels have a relatively high content of dissolved gas, particularly nitrogen and hydrogen, which affects the quality.

The reaction kinetic of the slag-melt reaction which takes place in the furnace is, as is known, significantly dependent on, and determined by, the flow conditions in the melt or bath. Since in the electric arc furnace there is little or no refining reaction to generate flow in the bath or melt, it has previously been proposed to fit electric arc furnaces with agitating coils which, without having any heating effect, cause the desired flow conditions in the bath in an inductive manner. Such agitating coils have been used particularly in electric arc furnaces having a relatively large bath depth and a great furnace diameter.

In order to be able to process charges which originally contain high crude iron contents, electro-steels are oftentimes produced by the so-called Duplex process. In this process, the original charge is first pre-refined in a hearth furnace or converter. Thereafter, the melt is treated in an electric arc furnace in which the steel is completed. This Duplex process requires, of course, extensive expenditure in respect to equipment. In addition, the temperature losses are great and the melt has a tendency to absorb oxygen during the transfer from the pre-melting furnace into the electric arc furnace. Disregarding these disadvantages, electro-steels which are produced by the Duplex process of course contain the entire amount of dissolved gases, and this is usually a very high amount.

In order to alleviate this disadvantage, steel manufacturing furnaces have been proposed in which metallurgical slag processes take place and in which a Siemens-Martin furnace and an electric arc furnace are combined to a single structural unit. From a constructional point of view, such a combined furnace is built like a Siemens-Martin furnace with electric arc electrodes being arranged in the arch of the furnace. The steel, for melting and refining purposes, is heated with solid, liquid or gaseous fuels, while the subsequent completion of the melt is effected in the same furnace by electric arc heating and under exclusion of air and gas. Such a combined furnace has thus two different heating arrangements which, however, can only be actuated sequentially and not simultaneously. The known combined furnaces have a flat hearth, in fact which is unfavorable for the formation of a sufficient flow of the melt so that the use of inductive heating coils or the like may be required for such furnaces.

Furthermore, induction furnaces having troughs or channels are known in the metallurgical technology which, however, do not permit slag processess and which primarily serve the purpose of retaining the heat and overheating of casting iron in a temperature range of between 1300 and 1500° C.

The invention relates to a furnace for the production of steel in which simultaneously metallurgical slag processes take place and which is fitted with two separate heating arrangements. The invention is also concerned with a method for operating such a furnace.

Considering the state of the art as referred to above, the invention has for its purpose to produce steel of high purity in a relatively inexpensive manner. In particular, it is an object of the invention to produce steel which has a low sulfur, phosphor and gas content and which steel thus combines the beneficial quality characteristics of steel produced in the Siemen-Martin furnace with those of steel made in an electric arc furnace without, however, having the disadvantages of such steels.

In accordance with the invention there is provided a furnace or system having two distinct heating arrangements preferably in two zones forming a two-phase bath slag. The temperature in each zone is regulated either separately or simultaneously to maintain a temperature distribution which facilitates the reaction kinetic so that a bath movement or flow takes place which is sufficiently strong to obtain the desired results and which is independent from the timely course of the metallurgical phenomena which take place.

In accordance with a preferred construction, the furnace includes an upper furnace portion, which is heated from above by a heating arrangement of high gas temperature and high efficiency density and a lower furnace portion subjacent the upper one which consists of one or several channels or troughs heated by electrical induction. In particular, the upper furnace portion may, for example, be fitted with electric arc heating means or with a burner which is actuated with a fuel-oxygen mixture.

In an electric arc furnace, the high temperature of the electric arc channel which forms one portion of the furnace atmosphere is obtained in physical manner by gas discharge. By contrast, if a burner is used, this high temperature is achieved in a chemical manner by burning the fuel by means of the oxygen which is supplied. In addition to the high gas temperature, the embodiments of the invention have in common that they also have a high efficiency density, efficiency density in this sense meaning the generated heat energy per ton of furnace charge.

In accordance with the method of the invention, when the furnace is to be operated and after the furnace has been charged with the solid components, the heat energy which is necessary to heat the solid charge should at least predominantly be supplied from heat emanating from the upper furnace portion, to wit, by actuating the heating elements in the upper furnace portion. Subsequent to this initial heating step, to wit, when the temperature has reached a range which is in the vicinity of melting temperature, it is recommended to supply the required heat energy, at least predominantly, by means of induction heating of the lower furnace portion and thus to supply the heat to the charge from said lower furnace portion. In this manner, and during the entire melting procedure, including the initial heating period, high energy output and efficiency are obtained since with a cold charge the heating with high gas temperatures is rapid and more economical, while induction heating caused by the lower furnace portion when the charge has already reached a relatively high temperature is favorable with regard to energy utilization.

Accordingly, it is an object of the invention to provide a metallurgical furnace for production of steel having two separate heating arrangements with a separate heating device provided in the upper portion of the furnace and the lower portion and where the lower portion is advantageously provided with electrical induction heaters.

A further object of the invention is to provide an improved method of forming steel using a furnace having two separate heating zones in which the lower portion of the furnace includes an induction heater for heating and for facilitating the flow of the melt comprising charging the furnace with a liquid charge, particularly crude iron, in the lower portion, while the upper portion is charged with a solid charge, particularly scrap, and melting the solid charge by predominantly heating the upper portion of the furnace while the furnace charge is refined.

A further object of the invention is to operate a furnace of the type having a lower inductive heater and an upper heater which may be either an arc-type heater or a gas burner which comprises supplying the heat energy necessary for melting the charge during the initial heating period at least predominantly at the upper portion of the furnace while heating at a temperature range which is near melting temperature predominantly by the lower portion of the furnace using induction heating.

A further object of the invention is to provide an improved furnace construction which includes an upper portion and a lower portion of generally smaller dimension having an induction heater therein which may be operated for facilitating the flow of the melt and with an added heating arrangement in the upper portion of the furnace which advantageously may comprise an electric arc heater or burner.

A further object of the invention is to provide a furnace construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
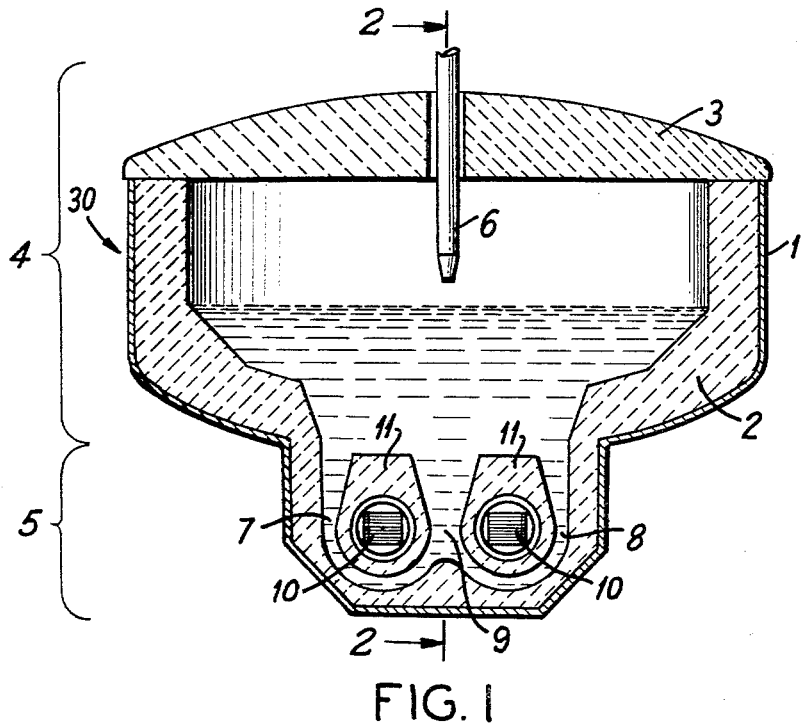
FIG. 1 is a vertical section through a furnace constructed in accordance with the invention.
Figure 2:
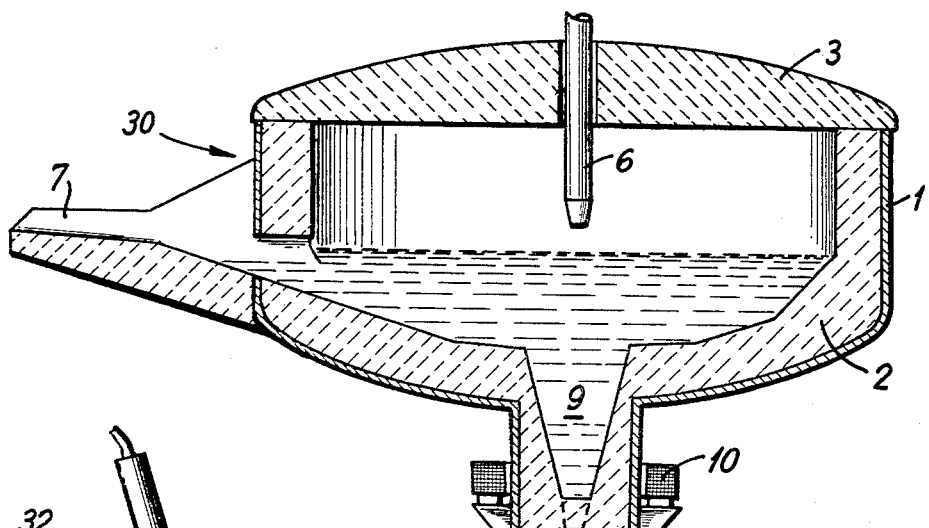
FIG. 2 is a section taken on the line II—II of FIG. 1.

Referring to the drawings in particular, the invention embodied in FIGS. 1 and 2 includes a furnace generally designated 30 which is formed with an outer metallic jacket 1 and a refractory lining 2. The upper portion of the furnace is of a greater dimension than the lower portion and it is covered by means of a cover 3 which may advantageously be made of a refractory material.

In accordance with the invention, the furnace 30 is advantageously characterized by two separate heating zones indicated as being generally divided into an upper heating zone portion 4 at the upper portion of the furnace and a lower heating zone portion 5 at the lower portion of the furnace.

It is advantageous to construct the furnace walls of several parts to facilitate the assembly and repair of the furnace and the upper and lower furnace portions are advantageously made so that they can be separated from each other.

In the embodiments of FIGS. 1 and 2 a heating device 6 comprises a fuel (e.g. oil) oxygen burner and it extends downwardly toward the melt through the cover 3 to heat the upper portion of the furnace. This heating device 6 provides a high gas temperature at the upper portion of the furnace 4 with a high efficiency density. The lower furnace portion 5 contains two troughs or channels 7 and 8 having a through or joint channel leg 9 therebetween. The channels 7 and 8 are heated by electrical induction through an induction coil 10 which extends through the wall of the furnace at the lower portion 5 and is embedded in the refractory lining 11. The induction coils advantageously have associated with them means for cooling them.

The furnace of the invention for the production of steel with the simultaneous performance of metallurgical slag processes is essentially operated as follows:

At the beginning of the operation, the crude iron charge is about 25% of the weight of the entire charge which is filled into the furnace. This fills the troughs or channels 7, 8 of the lower furnace portion 5 having a liquid sump. At the same time, the inductive heating coil 10 of the lower furnace is actuated in order to avoid temperature losses of the liquid sump.

Subsequently, scrap is supplied to the furnace through the top and the furnace is closed with the cover 3. Now the oil-oxygen mixture of the burner 6 is ignited and the scrap heated with high burner output. In order to obtain a favorable energy output and after heating of the charge, the burner effect is reduced and the inductive heat effect is increased. Scrap of large size is supplied in a step-wise manner and is melted. At the same time, lime and other additions are added in order to initiate the metallurgical processes in the furnace at an early stage.

After the entire charge has been melted, an intensive refining takes place under the slag layer which in the meantime has liquified, whereby due to the inductively generated flow movement of the melt the refining reaction is still further increased and speeded up.

After initial refining, the final refining of the melt takes place. The first slag is thus withdrawn and refining slag is added. In doing so, the inductive movement of the bath causes the desired intense alternating reaction between bath and refining slag which is maintained in a hot and reactive state by the burner 6. The burner 6 is not operated at full capacity at this time. The total heat energy which is supplied to the furnace during this latter refining procedure is primarily taken from the lower furnace portion, i.e. from the induction heating provided therein.

The charge which is now adjusted with regard to analysis and temperature to the desired optimum values is emptied into ladles or the like by tilting the furnace and pouring through a trough or spout 7.

The production of a steel of the quality SAE 4130 in a 30 ton capacity furnace may in accordance with the invention take place as follows:

7.5 tons of liquid steel crude iron are charged into a furnace at 1280° C. and the 2,000 kw. trough heating is actuated with 35% of its nominal output.

Immediately after charging the crude iron into the furnace, which takes about five minutes, three baskets of scrap of 8 tons each are inserted from above into the furnace at time intervals of 15, 25 and 35 minutes. After the first basket of scrap has been inserted, the oil-oxygen burner 6 provided in the cover of the furnace is ignited and is operated with an air factor of 1.05 (the air factor is the ratio of supplied amount of oxygen to the amount of oxygen necessary for stoichiometric complete combustion). The maximum heat effect of the burner amounts to 12 million kilo calory per hour. At the same time the output of the induction trough is increased from the initial 35% within 85 minutes to 85–95% of the nominal output. Contrary to electric arc furnaces, it has been shown to be advantageous to supply the slag forming addition, i.e. in the present case 1100 kg. lime and 100 kg. of fluor spar only with the last basket in order not to influence the heat transfer from the burner to the liquid bath.

After 140 minutes, the entire metallic charge is liquified and has a carbon content of 0.68% and an iron content in the slag of 11.8%, a bath temperature of 1540° C. From that time on, the burner output is reduced to 18–24%, the value of the air factor is, however, increased to 2.30 in order to obtain a sufficiently high refining velocity in the bath. After an additional 25 minutes, the slag (tilting angle of the furnace 7°) is withdrawn with a carbon content of 0.34% of the steel and after solidifying the final slag at 1660° C. bath temperature 400 kg. of burned lime and 100 kg. fluor spar are added. After switching off the oil-hydrogen burner, rapidly a thin-flowing grey-white slag layer is formed on the bath surface. The induction trough remains during the entire slagging procedure in switched-in position. After addition of 140 kg. of FeSi, 460 kg. of FeMn and 730 kg. of FeCr, an additional 35 minutes are necessary for adapting the exact tapping temperature in order to obtain the desired chemical analysis of the desired steel quality SAE 4130: to wit 0.31% C; 0.52% Mn; 0.23% Si; 1.01% Cr; 0.011% P; 0.010% S; 0.004% N; 0.002% O The entire charging time up to the tapping time amounts in this melt to 3 hours 50 minutes.

When small-piece scrap is used, it has been found to be advantageous to supply this scrap continuously under the area where the flame of the oil-oxygen burner hits the charge. In this manner, a too strong oxidation at the surface of the scrap during the preheating at above 1300° C. is avoided and, on the other hand, the charging time is still maintained short.

Figure 3:
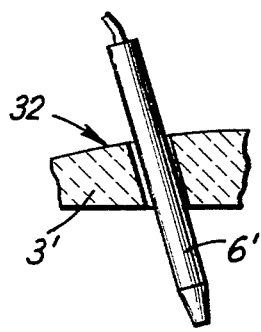
FIG. 3 is a partial vertical section of another embodiment of a furnace.

In the embodiment indicated in FIG. 3, a furnace generally designated 32 which is only partly indicated includes a cover 3' having a heating means 6' which in this embodiment comprises an electric arc heating means.

In the inventive process, the furnace is advantageously operated so that the lower furnace portion, constructed as an induction trough or channel, is charged with liquid components of the charge, particularly crude iron, while the upper furnace portion is charged with a solid charge, particularly scrap. The solid charge is then predominantly melted by the heat emanating from the upper furnace portion and the furnace charge is then subsequently refined. In order to facilitate the refining reaction, the heating of the upper furnace portion during the refining procedure is continued so that a hot and reactive slag is obtained. If the furnace is fitted with a fuel-oxygen burner, then the refining may be still further advanced by supplying an oxygen excess to the burner. If, however, the formation of brown smoke is to be suppressed, then the operation of the burner should be effected in range which is approaching the stoichiometric fuel-oxygen ratio.

If during the final period of the refining treatment the charge is heated predominantly by induction heating emanating from the lower furnace portion, then the charge can be adapted very exactly to the optimum temperature which is desired in each instance for tapping or pouring purposes. Moreover, if one proceeds in this manner, the dissolution of the gases which are contained in the furnace atmosphere in the steel to be completed is significantly reduced. For this reason it may be advantageous to maintain the charge during the entire refining period, practically exclusively above the induction trough of the lower furnace at the required temperature.

This is particularly applicable when, for example, between the refining or blowing and the final refining steps, a vacuum treatment of the steel is interposed in order to obtain a particularly low gas content.

The technical advance of the invention is particularly seen therein that with a relatively small apparative and technological expenditure both alloyed and not alloyed carbon steels of particularly low sulfur, phosphor and gas contents, particularly with regard to nitrogen and hydrogen, can be obtained.

While specific embodiments of the invention have been shown and described in detail to illustrate the application of the inventive principles, it will be understood that the invention may be embodied otherwise without departing from such principles.

What is claimed is:

1. A process for operating a furnace having an upper and lower portion in communication with a separate heating device in the upper portion and an induction heater in the lower portion comprising charging the furnace with a liquid charge which includes a solid charge, initially heating the charge to melt the solid charge at least predominantly by heating the upper portion of the furnace through the actuation of the heating device, refining the furnace charge during the heating and heating the lower portion of the furnace to approximately around the temperature range which is near the melting temperature, carrying out a final refining of the steel after the initial refining has taken place, at least in the final period of the final refining heating the charge predominantly by induction heating of the lower portion of the furnace and continuously charging the furnace with a solid metallic charge in finely divided form while the heating device is operated in the upper portion of the furnace and while the induction heater is operated in the lower portion of the furnace.

2. A process for operating a furnace having an upper and lower portion in communication with a separate heating device in the upper portion and an induction heater in the lower portion comprising charging the furnace with a liquid charge which includes a solid charge, initially heating the charge to melt the solid charge at least predominantly by heating the upper portion of the furnace by using a heating device comprising a fuel and oxygen burner which is operated with an excess of oxygen, refining the furnace charge during the heating and heating the lower portion of the furnace around the temperature range which is near the melting temperature, carrying out a final refining of the steel after the initial refining has taken place, at least in the final period of the final refining heating the charge predominantly by induction heating of the lower portion of the furnace, continuously charging the furnace with a solid metallic charge in finely divided form of the furnace and while the induction heater is operated in the lower portion of the furnace by charging at a location in the range where the flame of the burner hits the charge.

3. A method of processing steel using a furnace having an upper portion with a first heating device such as a fuel and oxygen burner and a lower portion with an induction heating device for facilitating movement of the melt comprising charging the furnace with crude iron which is at least about 25% of the weight of the entire charge while heating the furnace at the lower portion to maintain a liquid melt and to avoid a temperature loss of the liquid melt, subsequently adding scrap to the top of the furnace and heating the upper portion of the furnace with the heating device at the upper portion, gradually reducing the heating at the upper portion and increasing the heating at the lower portion, adding scrap to the furnace as the heating is progressing and at the same time adding materials such as lime to initiate the metallurgical process, continuously heating the melt by the induction heater in the lower portion of the furnace in order to provide an intensive refining under the slag layer which is speeded up by the inductive movement of the melt by the induction heater, and after initially refining then finally refining the melt by first withdrawing the slag and adding a refining slag.

4. A method of processing steel using a furnace having an upper portion with a first heating device such as a fuel and oxygen burner and a lower portion with an induction heating device for facilitating movement of the melt comprising charging the furnace with crude iron which is at least about 25% of the weight of the entire charge while heating the furnace at the lower portion to maintain a liquid melt and to avoid a temperature loss of the liquid melt, subsequently adding scrap to the top of the furnace and heating the upper portion, gradually reducing the heating at the upper portion and increasing the heating at the lower portion, adding scrap to the furnace as the heating is progressing and at the same time adding materials such as lime to initiate the metallurgical process, continuously heating the melt by the induction heater in the lower portion of the furnace in order to provide an intensive refining under the slag layer which is speeded up by the inductive movement of the melt by the induction heater, after initially refining then finally refining the melt by first withdrawing the slag and adding a refining slag, maintaining the reactive materials in the furnace in a hot and reactive state by using a fuel and oxygen burner which is operated at full capacity in the upper portion of the furnace, and thereafter reducing the heating at the upper portion and primarily heating the material from the lower portion.

References Cited
UNITED STATES PATENTS

| | | | |
|---|---|---|---|
| 1,293,164 | 2/1919 | Moore | 75—10 |
| 3,092,682 | 6/1963 | Tama et al. | 75—10 |
| 3,290,031 | 12/1966 | Maatsch et al. | 75—12 |

L. DEWAYNE RUTLEDGE, *Primary Examiner.*

W. W. STALLARD, *Assistant Examiner.*